Patented Mar. 1, 1938

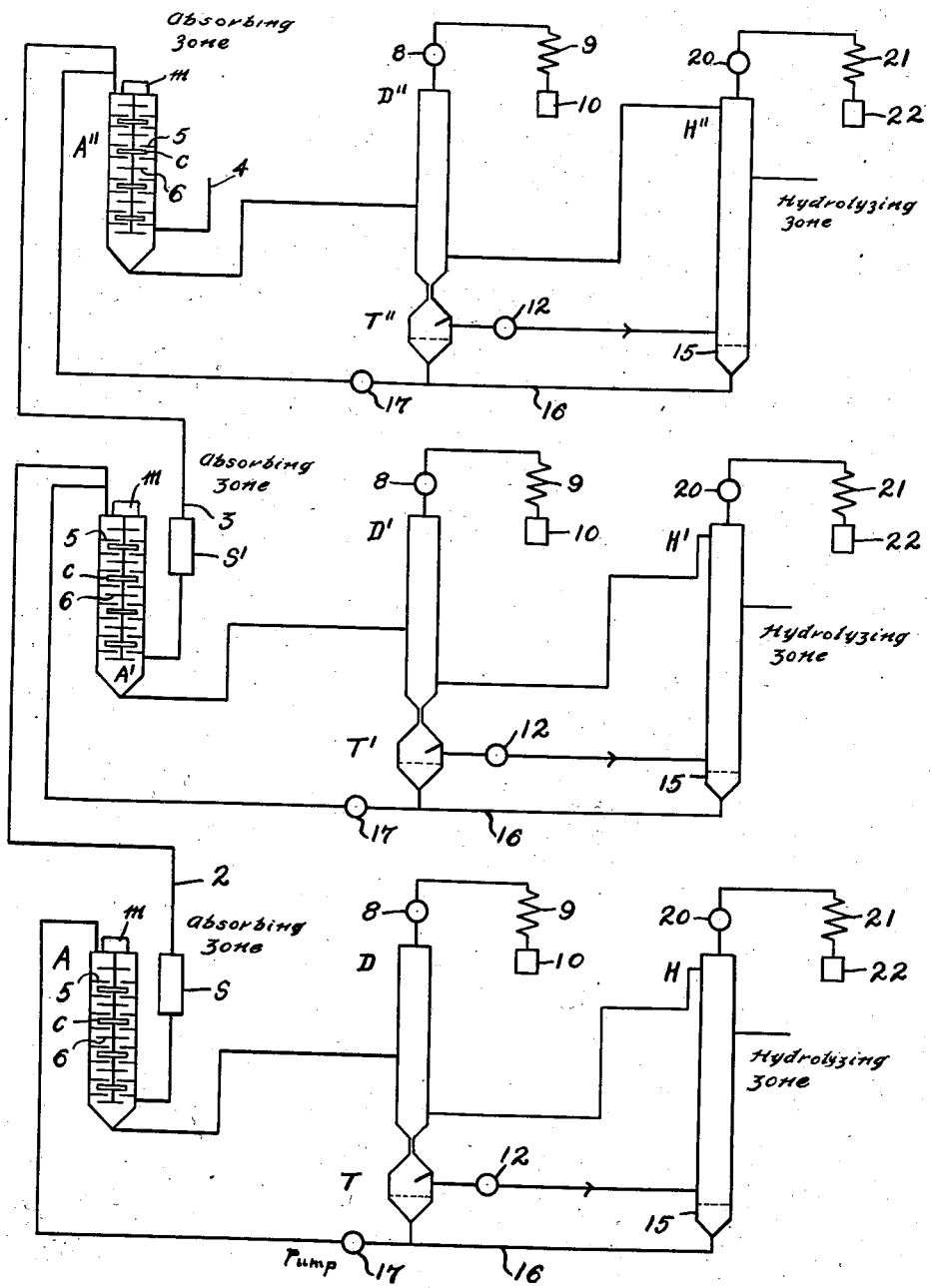

2,109,462

UNITED STATES PATENT OFFICE 2,109,462

MANUFACTURE OF ALCOHOLS FROM OLEFINES

Robert E. Burk and Herman P. Lankelma, Cleveland, Ohio, assignors to The Standard Oil Company, Cleveland, Ohio, a corporation of Ohio Application January 23, 1936, Serial No. 60,484

12 Claims. (Cl. 260—156)

Although the production of alcohols by absorption of olefines in sulphuric acid has been known for sometime, the costs in such procedure have remained higher than desired and have correspondingly restricted the possibilities of production. This has been due to several factors, including low efficiency in absorption, excessive losses into undesired by-products, and undue cost of concentrating the sulphuric acid for reuse. In accordance with the present invention however, such difficulties may be obviated, and alcohol products in remarkably advantageous manner may be attained.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative however, of but a few of the various ways in which the principle of the invention may be employed.

In said annexed drawing:—The sole figure is a semi-diagrammatic elevational view of equipment in accordance with the invention.

Olefinic gases from any suitable source are passed into absorption zone A into intimate contact with sulphuric acid. While absorption may be carried on in one absorbing zone, we prefer to pass the gas through successive absorption zones, each of which is adjusted to a condition selectively effective upon respective olefines in succession. Thus, absorption zone A may be operated on a basis to selectively absorb iso-butylene, thence the gas is passed through connection 2 to absorption zone A' where operating conditions are adjusted to selectively absorb propylene and butylenes, and thence the gas remaining is passed through a connection 3 to absorption zone A" where conditions are adjusted to selectively absorb the ethylene. Residual gas is vented through connection 4 to any suitable point for other use or disposal. In these respective absorption zones, the acid concentration in zone A may be for instance above 60 per cent and the temperature 60 to 250° F.; in zone A' the acid strength may be above 80 per cent and the temperature 60 to 250° F.; and in zone A" the acid strength may be above 90 per cent and the temperature 60 to 250° F. Preferably, after each of the absorbing zones A, etc., polymerized gaseous components are removed, as by passage through a scrubbing zone S, S', the gas being flowed counter-currently therein to scrubbing liquid such as water. In the absorbing zones, the olefines may be contacted with the acid in such manner as may be desired, as for instance by a spray jet of acid with the feed of gas, but preferably we employ an intensified absorption action by mechanically subdividing and superagitating the acid and gas together, or by employing centrifugal force to produce intimate and rapid contact, positive mechanical agitators being arranged in the absorption zone such as to centrifugally hurl transverse currents of the acid through the gas rising through the column of liquid, and the acid traveling in a general downward flow direction, centrifugal elements c being driven by a suitable source of power, as a motor m, and the centrifugal units being positioned with respective semi-partitioning 5 and counter baffle 6, for further assisting in the intensive mixing. At the zone of quiescence at the bottom of the absorption zone, the acid with absorbed products may be drawn off to a vacuum polymer-stripping zone D, D', D" respectively. In such zone, which may be in the form of a plate fractionating column or baffle tower, and which is maintained under partial vacuum by pump 8, any polymerized products which are absorbed in the acid are drawn off and cooled in the condenser coil 9 and caught in receiver 10. Desirably, an absorption-promoting catalyst is present in the absorption zones A, A', A". For this, we may employ silver sulphate, cuprous sulphate, mercury sulphate, potassium ferrocyanide, etc., the catalyst being in small amount, as 0.01 to 7.0 per cent.

To arrest reaction by the acid at the stage of normal ester formation, instead of allowing it to go on to loss-occasioning excess, we mix the sufficiently reacted constituents with a selective agent for immediately dissolving the esters out of the acid. Such selective solvent may be one operating upon the acid esters or one operating upon the normal esters. Preferably, the latter, and for this we employ decahydronaphthalene, or a naphthenic solvent. A prolific source of by-product waste and loss is thereby obviated, since the desired esters formed are taken up by the selective solvent and shielded from further direct action by the acid. The general mixture of acid and ester solvent, settling down into the separator zone T, T', T" respectively, separates into layers of acid and solvent. The solvent and esters carried thereby is drawn off from the top layer by a pump 12, and forwarded to a hydrolyzing zone H, H', H" respectively, each in association with its part of the system operating for butyl alcohols, isopropyl alcohol and ethyl alcohol respectively. In the hydrolyzing zone, which desirably is of an elongated or columnar form and provided with extensive contact-surfacing, as packing and the like, the solvent-borne esters are subjected to the action of hydrolyzing water molecules at appropriate temperature, as hot water at approximately 212° F. or exhaust steam. Unlike prior practice involving dilution of esters with many times their volume of water, the present process employs a relatively very small amount of water. This is introduced at a mid point in a relatively small cross section elongated hydrolyzing tower. The water molecules as thus introduced are, although in small amount, relatively concentrated at the point of introduction, as related to the cross section of the column. Thus, a small amount of water localized in its application effects a thorough-going hydrolysis in the oncoming stream of ester, and the acid which is formed proceeds on down to the base of the tower becoming more concentrated as it descends whence it is drawn off from the quiet zone 15 by a connection 16 and pump 17 to re-cycle to the absorption zone A, A', A'', as the case may be in each part of the system for the respective olefines being operated upon. At the same time as the acid is released in the hydrolyzation, the alcohol which is formed is at once drawn off from the hydrolyzing zone, the pressure in the tower being reduced by a suitable reducing means, as a pump 20, and the alcohol which ordinarily contains some water and ether proceeds through cooling condenser 21 to a receiver 22. With particular advantage, the hydrolysis and the absorption in each portion of the system may be carried on at substantially the same temperature. Thereby, heat-waste and inefficiency is particularly obviated. Thus, the hydrolyzing zone A for butyl alcohols may be operated at a temperature of 212° F., corresponding to the temperature in absorption zone A; the hydrolyzing zone H' may be operated at a temperature of 212° F., corresponding to that of absorption zone A'; and the hydrolyzing zone H'' may be operated at a temperature of 212° F. corresponding to the absorption zone A''. The presence of the selective solvent in this zone also is particularly effective, the acid being excluded and sent down, as rapidly as formed by the hydrolytic reaction.

Other modes of applying the principle of the invention may be employed, change being made as regards the details described, provided the features stated in any of the following claims, or the equivalent of such, be employed.

We therefore particularly point out and distinctly claim as our invention:—

1. A process of making alcohols from olefines by absorption in sulphuric acid, which comprises passing the olefines into successive absorption zones in the presence of an absorption-promoting catalyst at progressively higher concentrations for selective absorption of butylenes, propylene and ethylene, mechanically super-contacting the fluids in each absorption zone by centrifugally hurling transverse currents of the acids through olefines in each absorption zone, stopping reaction other than ester-formation by the presence of a selective solvent taking up normal esters, removing polymers between absorption zones under sub-atmospheric pressure, hydrolyzing by subjecting the esters to the action of a small amount of water molecules at a temperature in the neighborhood of 212° F. in an elongated hydrolyzing zone under sub-atmospheric pressure, separating acid in the presence of a selective solvent for normal esters, and returning the acid for absorption of more olefines.

2. A process of making alcohols from olefines by absorption in sulphuric acid, which comprises passing the olefines into absorption contact with sulphuric acid in the presence of an absorption-promoting catalyst, mechanically super-contacting the fluids by centrifugally hurling transverse currents of the acid through the olefines, stopping reaction other than ester formation by the mixture with a selective absorbent taking up normal esters, removing polymers under sub-atmospheric pressure, hydrolyzing at substantially the same temperature as the absorption by subjecting the ester in the presence of a selective solvent for normal esters to the action of a small amount of water molecules at a temperature in the neighborhood of 212° F. in an elongated hydrolyzing zone under sub-atmospheric pressure, separating acid and returning the acid for absorption of more olefines.

3. A process of making alcohols from olefines by absorption in sulphuric acid, which comprises passing the olefines into contact with sulphuric acid, mechanically super-contacting the fluids by centrifugally hurling transverse currents of acid through olefine, stopping reaction other than ester formation by mixing a selective absorbent taking up normal esters, removing polymers under sub-atmospheric pressure, hydrolyzing the ester solution at substantially the same temperature as the absorption by subjecting the ester to the action of a small amount of water molecules at a temperature in the neighborhood of 212° F. introduced in an elongated hydrolyzing zone under sub-atmospheric pressure, separating acid in the presence of a selective solvent for normal esters, and returning the acid for absorption of more olefines.

4. A process of making alcohols from olefines by absorption in sulphuric acid, which comprises passing the olefines into contact with sulphuric acid, stopping reaction other than ester formation by mixing in a selective absorbent taking up normal esters, removing polymers under sub-atmospheric pressure, hydrolyzing at substantially the same temperature as the absorption by subjecting the ester to the action of a small amount of water molecules at a temperature in the neighborhood of 212° F. in an elongated hydrolyzing zone under sub-atmospheric pressure, separating acid in the presence of a selective solvent for normal esters, and returning the acid for absorption of more olefines.

5. A process of making alcohols from olefines by absorption in sulphuric acid, which comprises passing the olefines into contact with sulphuric acid, stopping reaction other than ester formation by mixing in a selective absorbent taking up particularly normal esters, removing polymers under sub-atmospheric pressure, hydrolyzing the ester by a small amount of water molecules in an elongated hydrolyzing zone under sub-atmospheric pressure, separating acid in the presence of a selective solvent for normal esters, and returning the acid for absorption of more olefines.

6. A process of making alcohols from olefines by absorption in sulphuric acid, which comprises passing the olefines into contact with sulphuric acid, stopping reaction other than ester formation by introducing an absorbent taking up particularly normal esters, removing polymers under sub-atmospheric pressure, hydrolyzing the ester by a small amount of water molecules at a temperature in the neighborhood of 212° F. in an elongated hydrolyzing zone, separating acid in the presence of a selective solvent for normal esters, and returning the acid for absorption of olefines.

7. A process of making alcohols from olefines by absorption in sulphuric acid, which comprises passing the olefines into contact with sulphuric acid, stopping reaction other than ester formation by introducing an absorbent taking up particularly normal esters, removing polymers under sub-atmospheric pressure, hydrolyzing the ester by a small amount of water molecules at a temperature in the neighborhood of 212° F. in an elongated hydrolyzing zone, separating the acid, and returning the acid for absorption of more olefine.

8. A process of making alcohols from olefines by absorption in sulphuric acid, which comprises passing the olefines into contact with sulphuric acid, stopping reaction other than ester formation by introducing an absorbent taking up particularly normal esters, removing polymers, hydrolyzing the ester by subjecting to the action of water molecules, separating acid, and returning the acid for absorption of more olefine.

9. A process of making alcohols from olefines by absorption in sulphuric acid, which comprises passing the olefines into contact with sulphuric acid, removing polymers, separating acid in the presence of a solvent selective for normal ester, hydrolyzing the ester by water molecules, and returning the acid for absorption of more olefine.

10. A process of making alcohols from olefines by absorption in sulphuric acid, which comprises passing the olefines into contact with sulphuric acid, separating acid in the presence of a solvent selective for normal ester, hydrolyzing the ester by water molecules, and returning the acid for absorption of more olefine.

11. A process of making alcohols from olefines by absorption in sulphuric acid, which comprises passing the olefines into contact with sulphuric acid, removing polymers, separating acid in the presence of a solvent selective for normal ester, hydrolyzing the ester by water molecules, and returning the acid for absorption of more olefine in the presence of an absorption-promoting catalyst.

12. A process of making alcohols from olefines by absorption in sulphuric acid, which comprises passing the olefines into contact with sulphuric acid, separating acid in the presence of a solvent selective for normal ester, hydrolyzing the ester by water molecules, and returning the acid for absorption of more olefine in the presence of an absorption-promoting catalyst.

ROBERT E. BURK.
HERMAN P. LANKELMA.